(12) United States Patent
Chernicoff et al.

(10) Patent No.: US 10,568,798 B1
(45) Date of Patent: Feb. 25, 2020

(54) TRANSPORTATION SUPPORT FOR A USER HAVING CHRONIC OR ACUTE MOBILITY NEEDS

(71) Applicant: TOYOTA MOBILITY FOUNDATION, Plano, TX (US)

(72) Inventors: William P. Chernicoff, Silver Spring, MD (US); Ryan M. Klem, Dallas, TX (US)

(73) Assignee: TOYOTA MOBILITY FOUNDATION, Plano, TX (US)

( * ) Notice: Subject to any disclaimer, the term of this patent is extended or adjusted under 35 U.S.C. 154(b) by 0 days.

(21) Appl. No.: 16/298,461

(22) Filed: Mar. 11, 2019

Related U.S. Application Data

(63) Continuation of application No. 16/196,841, filed on Nov. 20, 2018.

(51) Int. Cl.
  *G08G 1/123* (2006.01)
  *A61H 3/00* (2006.01)
  *G01C 21/20* (2006.01)
  *G01C 21/36* (2006.01)

(52) U.S. Cl.
  CPC .............. *A61H 3/00* (2013.01); *G01C 21/20* (2013.01); *G01C 21/362* (2013.01)

(58) Field of Classification Search
  CPC ......... A61H 3/00; G01C 21/362; G01C 21/20
  See application file for complete search history.

(56) References Cited

U.S. PATENT DOCUMENTS

| 8,138,907 | B2 | 3/2012 | Barbeau et al. | |
| 8,768,626 | B1* | 7/2014 | Ganesh | G01C 21/3484 |
| | | | | 455/456.3 |
| 9,730,008 | B2 | 8/2017 | Park | |
| 9,961,535 | B2 | 5/2018 | Bucchieri | |
| 2007/0288511 | A1* | 12/2007 | Zink | G06F 16/951 |
| 2009/0182498 | A1* | 7/2009 | Seymour | G01C 21/20 |
| | | | | 701/533 |
| 2012/0229614 | A1 | 9/2012 | Jacobs | |
| 2014/0100773 | A1 | 4/2014 | Cunningham et al. | |
| 2016/0063893 | A1 | 3/2016 | Kanuganti et al. | |
| 2017/0053209 | A1* | 2/2017 | Ceret | G06N 5/048 |
| 2017/0124671 | A1* | 5/2017 | Tam | G06Q 50/14 |
| 2018/0091604 | A1* | 3/2018 | Yamashita | G06Q 20/28 |
| 2018/0137593 | A1* | 5/2018 | Djuric | G06Q 50/30 |
| 2018/0224866 | A1* | 8/2018 | Alonso-Mora | G05D 1/0291 |
| 2018/0274927 | A1* | 9/2018 | Epperlein | G01C 21/005 |
| 2018/0342157 | A1* | 11/2018 | Donnelly | G01C 21/3492 |
| 2018/0357912 | A1* | 12/2018 | Kessler | G08G 7/02 |
| 2019/0056233 | A1* | 2/2019 | Liu | G01C 21/3423 |

* cited by examiner

*Primary Examiner* — Howard D Brown, Jr.
(74) *Attorney, Agent, or Firm* — Oblon, McClelland, Maier & Neustadt, L.L.P.

(57) ABSTRACT

Processing circuitry provided in a mobile device of a user requiring mobility assistance is programmed to: request multimodal personal transportation assistance from a pool of candidate companions, receive a location of a selected companion and a proposed route between the user to the selected companion, and determine an estimated time of arrival of the selected companion at a current location of the user. The proposed route includes pedestrian travel and the request for multimodal personal transportation identifies any specific needs of the user.

4 Claims, 5 Drawing Sheets

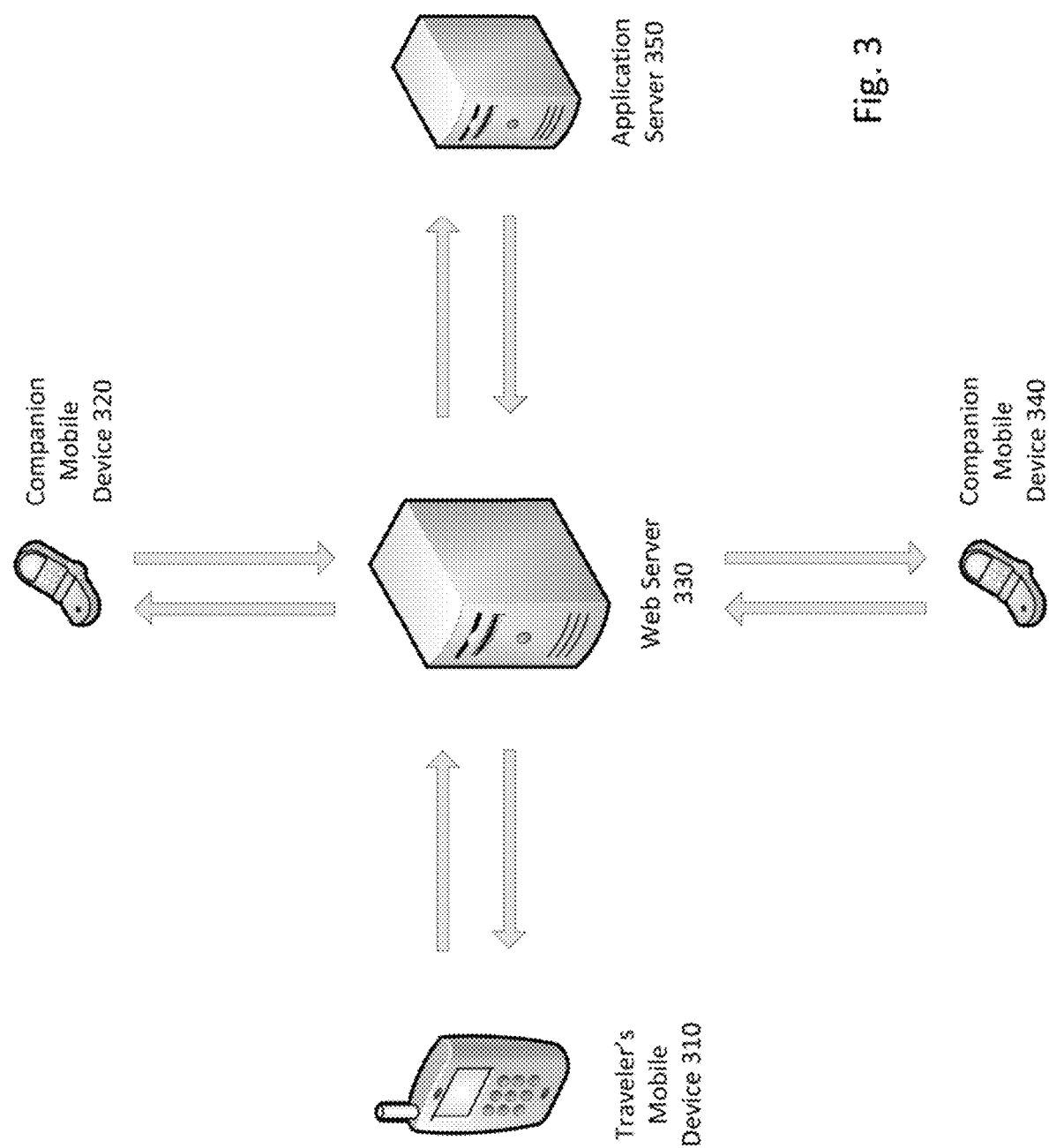

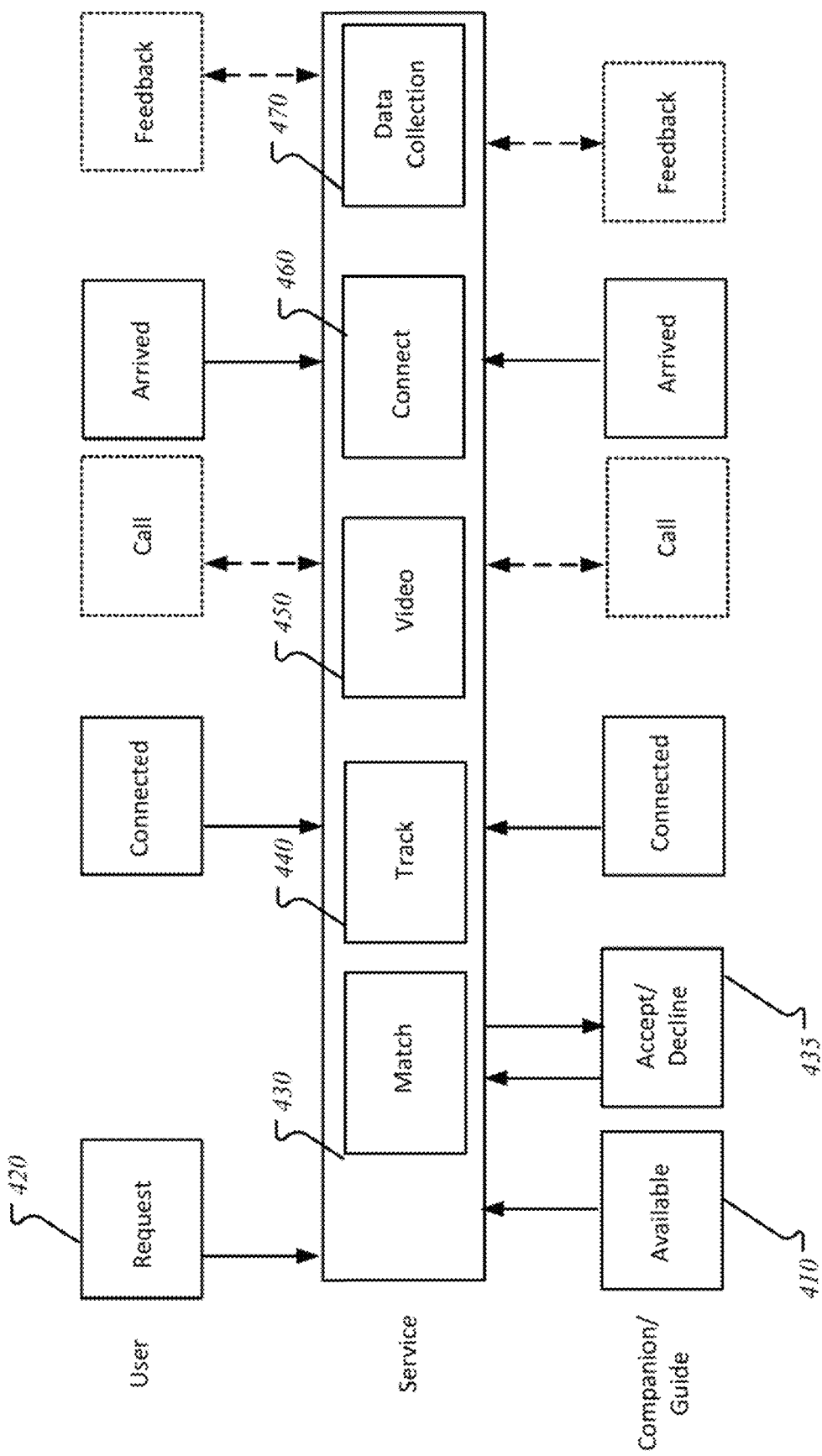

TRANSPORTATION SUPPORT FOR A USER HAVING CHRONIC OR ACUTE MOBILITY NEEDS

CROSS-REFERENCE TO RELATED APPLICATION

This application is a continuation of U.S. patent application Ser. No. 16/196,841 filed Nov. 20, 2018, the entire contents of which is incorporated by reference herein in its entirety.

BACKGROUND

Mobile applications provided by a transportation network company ("TNC") match passengers with drivers having their own privately owned vehicles. U.S. Patent Publication No. 2011-0313804 A1 entitled "System and Method for Arranging Transport Amongst Parties through Use of Mobile Devices" by Camp is directed to a system for enabling transportation to be arranged for individuals carrying mobile devices. Some services focus on wayfinding and navigation assistance indoors, but are limited to only specific buildings and provide limited service.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

Mobile applications provided by TNCs and other forms of pubic or on demand mobility do not enable a user to obtain mobility assistance originating from a location inside a building, or any location such as a residence, sporting venue, subway entrance/exit through to a desired end destination or journey segment (within the originating locale or otherwise). Moreover, mobility applications provided by TNCs do not match a user with a service provider (sometimes referred herein as a companion) based on specific needs such as language, vision or hearing impairment, or other disabilities including but not limited to physical and/or mental challenges. As a consequence of transportation support disclosed herein, the emotional and physical confidence of the user community to travel locally and in environments they do not know will improve substantially.

The mobility applications provided by TNCs also fail to provide, prior to a journey, detailed mapping information identifying mobility challenges for traversing large venues, buildings, and other properties and areas inaccessible by vehicles. This could include detailed mapping information identifying non-vehicular mobility challenges such as information related to wheel chair accessibility, the provision of audible and tactile cues for the blind, and resting areas for the elderly, for example.

To address these deficiencies among others, the present disclosure relates to a method and processing circuitry programmed to provide detailed mapping information to a user to assist the user in determining the viability of a journey prior to departure, the detailed mapping information identifying non-vehicular mobility challenges provided along a route of travel. Moreover, the processing circuitry can be programmed to enable a user having a chronic or acute mobility need to complete 100% of the desired journey, and to assist the user by matching the user with a service provider (e.g., a companion) to overcome mobility gaps that may otherwise prevent the user from taking the journey altogether whether a short trip within or to a venue or longer trips requiring traditional modes of transportation. The processing circuitry enables matching based on the user's specific needs (e.g., language, medical, autism spectrum, and/or other physical and/or mental challenges) and the companion's ability to accommodate those needs.

The solutions described herein address technical challenges confronted by the inventors including but not limited to generating and updating detailed mapping information, identifying non-vehicular mobility challenges, providing multi-floor navigation within a building or venue, connecting users and companions in an environment with poor GPS connectivity (using video/audio conferencing capabilities via the application), and facilitating multimodal personal transportation (i.e., pickup and handoff of the user using various forms of transportation including, by way of non-limiting example, automotive transportation and wheel chair assistance). The detailed mapping can be provided with zooming functionality to show location of both the user and the companion within the application.

According to an embodiment of the disclosure, processing circuitry provided in a mobile device of a user requiring mobility assistance is programmed to: request a single mode or multimodal personal transportation assistance from a pool of candidate companions, receive a location of a selected companion and a proposed route between the companion to the user, and determine an estimated time of arrival of the selected companion at a current location of the user. The request for multimodal personal transportation identifies any specific needs of the user.

According to a related embodiment of the disclosure, processing circuitry provided in a mobile device of a candidate companion is programmed to: determine whether an individual is available to serve as a companion, in a case where the individual is available as a candidate companion, receive a request to provide various multimodal personal transportation assistance for a user, notify the candidate companion that the request has been received, receive a response from the candidate companion accepting or denying the request, and in the case where the candidate companion accepts the request, to determine an estimated time of arrival of the candidate companion at a current location of the user.

According to yet another related embodiment of the disclosure, mobile application server processing circuitry is programmed to: match a user having at least one mobility need with a companion having at least one characteristic suited to assist the user, determine a route between a location of the companion and a location of the user, the route including at least one segment requiring non-vehicular routing. Non-vehicular routing includes navigation within a building and/or routing where vehicular access is not permitted.

According to yet another related embodiment of the disclosure, the mobile application server processing circuitry is programmed to provide voice to text or vice versa mobile phone capabilities.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a schematic illustrating a network topology including a mobile application server and mobile devices used by the user and potential companions;

FIG. 4A is a flowchart illustrating a service connection between the user and companion applications.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

A user may have special mobility needs during a trip. The mobility needs may be due to physical challenges which can be addressed by use of, for example, a wheelchair (manual or powered), a prosthetic appendage, service animal, portable oxygen, a powered scooter, crutches, and a rolling walker. Physical disabilities such as visual and hearing impairment may also result in a need for mobility assistance. Users with mental disabilities or challenges can also benefit from traveling with a companion or receiving human assistance.

Figure 1:
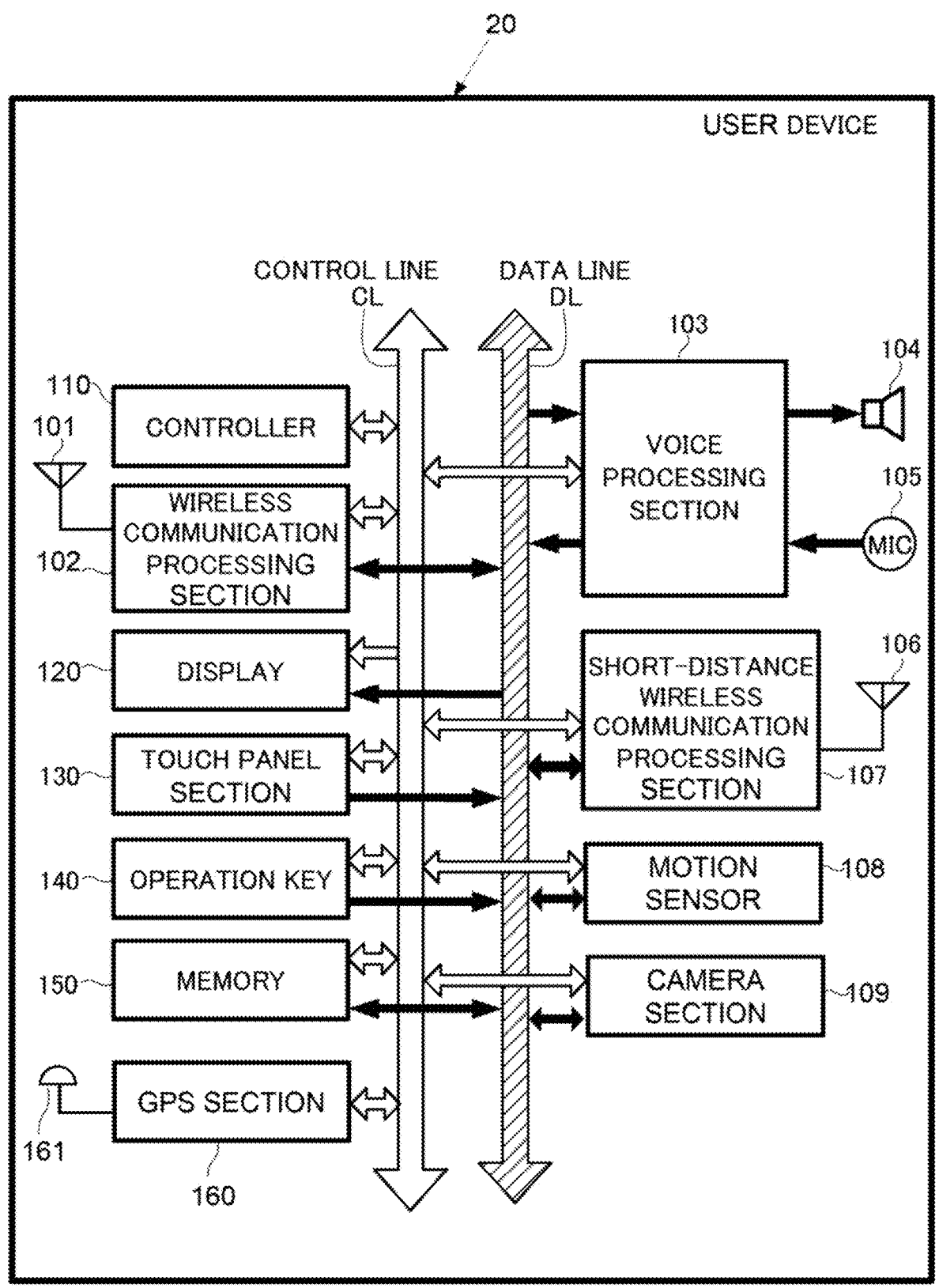
FIG. 1 is a schematic of a mobile device having processing circuitry which can be programmed with the user or companion application software.

FIG. 1 is a detailed block diagram illustrating an exemplary mobile device 20 which can be utilized to pair a user with mobility needs with a companion whom can provide assistance. In certain embodiments, mobile device 20 may be a smartphone. However, the skilled artisan will appreciate that the features described herein may be adapted to be implemented on other devices (e.g., a laptop, a tablet, a server, an e-reader, a camera, a navigation device, etc.). The exemplary mobile device 20 includes processing circuitry 110 (sometimes referred to herein as a controller) and a wireless communication processor 102 connected to an antenna 101. A speaker 104 and a microphone 105 are connected to a voice processor 103. The voice processor enables, among other things, voice recognition capabilities for both the user and companion mobile devices.

The controller 110 may include one or more Central Processing Units (CPUs), and may control each element in the mobile device 20 to perform functions related to communication control, audio signal processing, control for the audio signal processing, still and moving image processing and general overall application control, along with other kinds of signal processing. The controller 110 may perform these functions by executing instructions stored in a memory 150. Alternatively, or in addition to the local storage of the memory 150, the functions may be executed using instructions stored on an external device accessed on a network/server or on a non-transitory computer readable medium. Memory 150 includes but is not limited to Read Only Memory (ROM), Random Access Memory (RAM), or a memory array including a combination of volatile and non-volatile memory units. The memory 150 may be utilized as working memory by the controller 110 while executing the processes and algorithms of the present disclosure in order to implement the functionality of the user and companion applications. Additionally, the memory 150 may be used for long-term storage, e.g., of image data and information related thereto. The wireless communication processor 102 controls the communication performed between the mobile device 20 and other external devices via the antenna 101.

The speaker 104 emits an audio signal corresponding to audio data supplied from the voice processor 103. The microphone 105 detects surrounding audio and converts the detected audio into an audio signal. The audio signal may then be output to the voice processor 103 for further processing. The voice processor 103 demodulates and/or decodes the audio data read from the memory 150 or audio data received by the wireless communication processor 102 and/or a short-distance wireless communication processor 107. Additionally, the voice processor 103 may decode audio signals obtained by the microphone 105.

The exemplary mobile device 20 may also include a display 120, a touch panel 130, an operation key 140, and a short-distance communication processor 107 connected to an antenna 106. The display 120 may be a Liquid Crystal Display (LCD), an organic electroluminescence display panel, or other display screen technology, known in the art. In addition to displaying still and moving image data, the display 120 may display operational inputs, such as numbers or icons which may be used for control of the mobile device 20. The display 120 may additionally display a GUI for a user to control aspects of the mobile device 20 and/or other devices. Further, the display 120 may display characters and images received by the mobile device 20 and/or stored in the memory 150 or accessed from an external device on a network. For example, the mobile device 20 may access a network such as the Internet and display text and/or images transmitted from a Web server.

The mobile device 20 may include a motion sensor 108. The motion sensor 108 may detect features of motion (i.e., one or more movements) of the user device 20. For example, the motion sensor 108 may include an accelerometer to detect acceleration, a gyroscope to detect angular velocity, a geomagnetic sensor to detect direction, a geo-location sensor to detect location, etc., or a combination thereof to detect motion of the user device 20. In certain embodiments, the motion sensor 108 may generate a detection signal that includes data representing the detected motion. For example, the motion sensor 108 may determine a number of distinct movements in a motion (e.g., from start of the series of movements to the stop, within a predetermined time interval, etc.), a number of physical shocks on the user device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 110, whereby further processing may be performed based on data included in the detection signal. The motion sensor 108 can work in conjunction with a Global Positioning System (GPS) section 160. The GPS section 160 detects the present position of the mobile device 20. The information of the present position detected by the GPS section 160 is transmitted to the controller 110. An antenna 161 is connected to the GPS section 160 for receiving and transmitting signals to and from a GPS satellite. In addition, location services for the mobile device 20 can be used. Location services use a combination of other services to pinpoint an exact location, including cellular data, cell tower location information, and sometimes Wi-Fi, Bluetooth, and GPS satellite signals.

The mobile device 20 may include a camera section 109, which includes a lens and shutter for capturing photographs of the user, companion, and/or surroundings around the mobile device 20, i.e., a selfie. Geographical identification metadata can be associated with a captured image in order to assist the user and companion in locating one another. In an embodiment, the camera section 109 captures surroundings of an opposite side of the mobile device 20 from the user. The images of the captured photographs can be displayed on the display panel 120 and/or transmitted to other users. A memory section saves the captured photographs. The memory section may reside within the camera section 109 or it may be part of the memory 150. The camera section 109 can be a separate feature attached to the user device 20 or it can be a built-in camera feature. A mobile device 20 used by a companion would have the same exemplary structural elements.

The processing circuitry of a mobile device for the user can be programmed to request single mode or multimodal personal transportation assistance from a pool of candidate companions, to receive a location of a selected companion and a proposed route between the user to the selected companion, and to determine an estimated time of arrival of the selected companion at a current location of the user. The request for personal transportation identifies any specific needs of the user.

The processing circuitry provided in a mobile device of a candidate companion can be programmed to determine whether a user is available to serve as a companion, in a case where the user is available as a candidate companion, to receive a request to provide personal transportation assistance for a user, to notify the candidate companion that the request has been received, to receive a response from the candidate companion accepting or denying the request, and in the case where the candidate companion accepts the request, to determine an estimated time of arrival of the candidate companion at a current location of the user.

Figure 2:
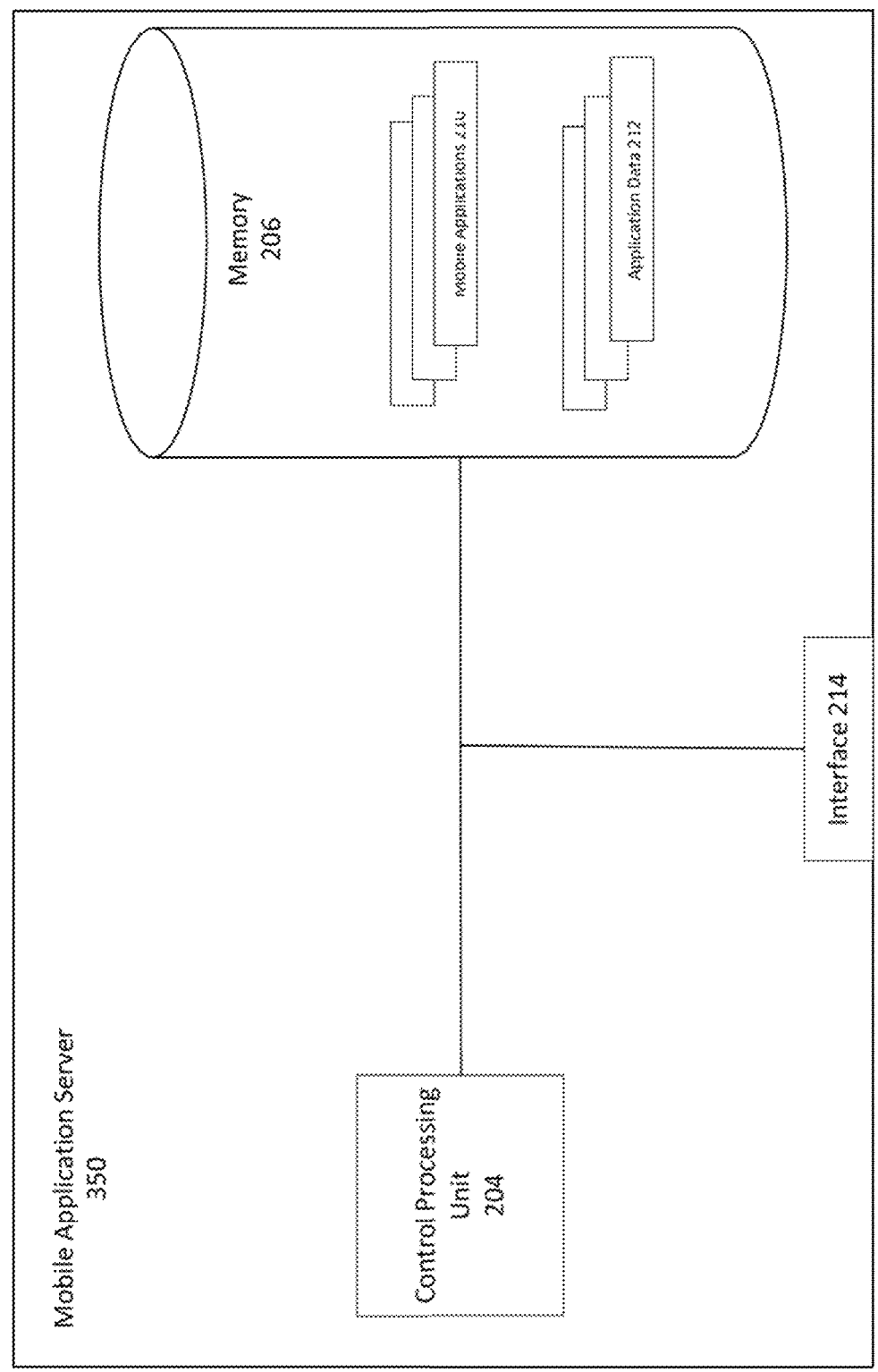
FIG. 2 is a schematic of a mobile application server having processing circuitry and programmed to interface with user and companion mobile devices via a web server.

FIG. 2 is a block diagram illustrating an exemplary Mobile Application Server 350. The Mobile Application Server 350 includes a microcomputer or a processor having CPU 204, Memory 206 and an Interface 214. In another embodiment, the CPU 204 is not necessarily constituted by a single processor but may be constituted by a plurality of devices. For example, some or all of these functions may be realized by an application specific integrated circuit (ASIC), a field programmable gate array (FPGA), a digital signal processor (DSP), or the like.

The Memory 206 serves to store, among other things, various Mobile Applications 210 and Application Data 212 of the users and companions for which the Mobile Application Server accesses to provide overall functionality. For example, the Application Data 212 can include a user's profile. The profile can include images and attributes of candidate companions such as the number of successful trips, companion skill sets, and language capabilities. Needs and traveling constraints of a user can also be stored in Memory 206 along with building schematics in order to assist in routing. Schematics of a building can also be uploaded to the Mobile Application Server from a mobile device on an as needed basis. The CPU 204 controls the Mobile Application Server utilizing input from the Interface 214 and the Mobile Applications and Application Data. The Memory 206 can also store non-vehicular mapping information collected by users and companions during a journey by correlating geo-markers with camera, GPS, and related information collectible by mobile devices.

FIG. 3 is a block diagram illustrating a network topology enabling communication of requests and replies between mobile devices 310, 320 and 340 and the mobile application server 350. As discussed above with reference to FIG. 2, the mobile application server 350 includes processing circuitry which controls the communications with the web server 330. However, the functionality of the web server 330 and the mobile application server 350 can be provided by a single CPU.

There are pluralities of ways in which users (sometimes referred to as "travelers") and companions can function with the mobile application including a venue-specific application where a third party hires companions to be available to help users in a geo-fenced area for a specific amount of time, (e.g., a baseball stadium providing ushers for users who need assistance). In an autonomous companion scenario, companions operate based on their own perceived demand, much like a taxi cab driver. A companion may hang out around a busy shopping district or historical landmark looking for users who may require their assistance.

FIG. 4A is a flow diagram illustrating the steps implemented by the network, the user's mobile application, and the companion's mobile application. The flow begins with one or more companions indicating their availability (Step 410). Next, the user requests a service using the mobile application (Step 420).

The user is matched with a companion based on a matching algorithm (Step 430) which is discussed in more detail below with regard to FIG. 4B. A companion identified by the matching algorithm can accept or deny the request in step 435. If the matched companion accepts the request, they are placed into a connected state. Except when actively providing a service to a user, the companion may choose to place herself into an inactive state and therefore become unavailable to future users. If the matched companion denies the request, then an alternative companion is selected by the matching algorithm.

Upon acceptance of a request, the user and companion mobile devices are connected to each other via the Application Server 350 and a tracking/mapping function begins (Step 440). During tracking, both the user and the companion can elect to begin a video call with each other to further assist with their connection (Step 450). This is an optional step and is not required to complete a connection between the user and the companion.

Next, the user and the companion connect with the arrival of the companion (Step 460). In most cases, the user stays in place and the companion travels to the user. However, in some cases both the user and the companion may be actively mobile. In either case, upon completion of a connection between a user and a companion, a feedback opportunity may be presented to the user and companion (Step 470). The feedback provides an opportunity for the collection of data in Memory 206 which may be useful in fine tuning the matching algorithm. For example, the companion can evaluate the services they were requested to perform and identify any additional services provided which the companion may not have provided in the past. Any additional information related to the trip route can be collected including any accessibility challenges encountered during the journey.

Figure 4B:
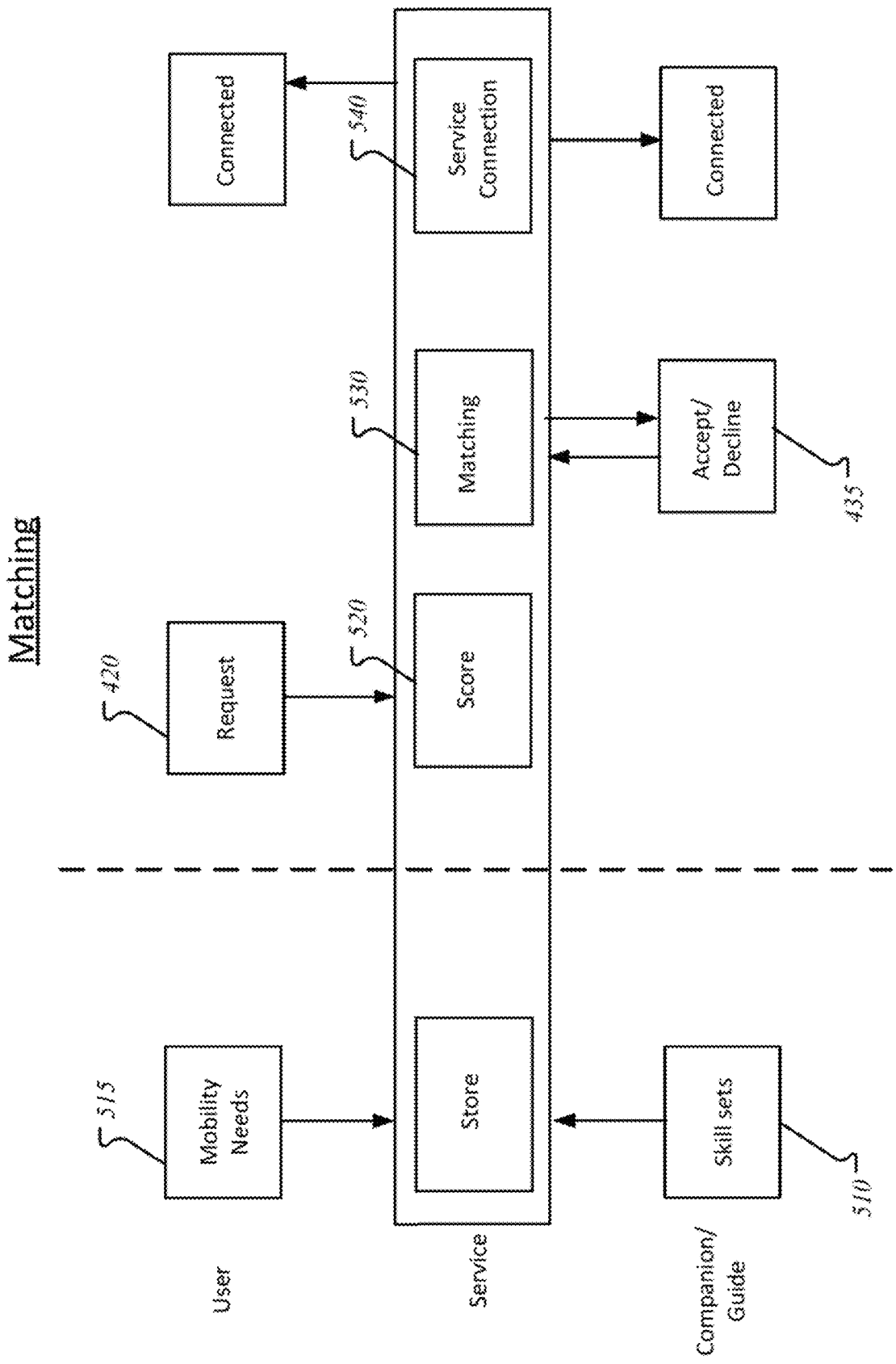
FIG. 4B is a detailed flowchart illustrating a process for matching the user and companion.

FIG. 4B is a flow diagram illustrating the flow for matching a user with one or more prospective companions. The flow begins with the prospective companions identifying their various skillsets which may be of use in assisting the mobility of a user (Step 510). These skills may include language fluencies, geographical knowledge, nursing abilities, etc. This information is preferably collected at the time the prospective companion registers with the system. The skillsets of the prospective companions can also be stored in the Memory 206. However, because users may have differing needs dependent on the intended trip, users may identify any special mobility needs at the time of request for service (Step 515). Those needs should supplement any mobility needs identified at the time of registration as a user.

In response to a request for service from a user to receive the assistance of a companion (step 420), a score can be determined for each prospective companion determined to be within a prescribed proximity to the user. In its most basic form, simple availability and proximity may be used by the mobile application server 350 as the criteria for matching a user with a companion. In an exemplary case, the companion must be in an "available" state and within a predetermined distance of a requesting user (e.g., 1000 meters). A random available companion satisfying the proximity requirement can be selected. Additionally, the selection of an available companion may be prioritized based on best match of provided skills, past user preferences, past companion performance, past companion workload, and other criteria. The selected companion can decline the request and another eligible companion will be chosen when possible. The requesting user is alerted if there are no eligible companions.

A next level of matching includes a first order matching between a potential companion's skillsets and services required by the user. In some scenarios, all requested user services must be accepted by a companion in order for the companion to be eligible for a match. However, in situations where a limited number of companions are available or one or more of the user's needs are deemed not to be critical, a match can be made even though all requested user services cannot be met. Optionally, a proximity requirement may be relaxed to locate a matching companion. Then, the best matching companions (offering the highest number of accepted services required by the user) can be ranked and communicated to the user for selection.

Additional levels of matching may be provided using a general state of the art machine learning algorithm. For example, a score can be determined based upon the attributes entered by the user and the companions (Step 520) using a matching algorithm such as provided by Sajari™. Testing or beta-runs can help dictate heuristics for the matching algorithm, which can then be used as a parameter for the machine learning algorithm that determines the best companion matches.

Candidate companions can be incentivized through a rewards or points system supported by merchants and venues or host organizations/event sponsors. According to one embodiment, the host will be responsible for vetting the companions and entering companion profiles into the system. Each companion will then be able to access the application and support a user with their needs to navigate through the venue. The feedback presented by the user is utilized by the companion to enhance their abilities to assist with navigation and/or accept a reward or accumulate points leading to a greater reward.

In most cases, the prospective companion having the highest score is invited to accept the request to serve. If accepted, then service connection (step 540) is implemented as described with reference to FIG. 4A. If declined, then the prospective service provider having the next highest score is provided the request to serve. If no companion is located, then the user is so informed.

Detailed Mapping

Prior to a journey, it is useful for a user with a mobility challenge to know information regarding non-vehicular mobility challenges, if any, which will be presented during the journey to a destination. This information could include information related to wheel chair accessibility, the provision of audible and tactile cues for the blind, and resting areas for the elderly, for example. The challenge in presenting this type of detailed mapping is collecting and maintaining accurate data for voluminous and distinct locations.

As an initial step, venues can be requested to provide detailed information of its buildings, walkways, restrooms, seating areas, and the like. Additional information can be collected by users and companions during a journey by correlating geo-markers with camera, GPS, and related information collectible by mobile devices. Further, mobility assistance devices such as wheelchairs, rollators, walkers, and eyeglasses can be equipped with cameras, Lidars, optical, audible sensors and the like to collect information passively during their use (means for collecting).

GPS/Location Services

In lieu of GPS functionality being used to provide routing to a fixed location such as a hotel, the mobility application can rely upon location services within the user and companion's mobile devices. In order to provide routing between a user and a companion, the routing algorithm must account for the potential mobility of both the user and the companion. Moreover, as discussed in more detail below with regard to Testing Scenario 3, the navigation should include routing within multi-floor buildings and other venues where traditional GPS routing is unavailable. A satellite or map view can be utilized by the user and companion respectively to assist in the connection process.

Elevation data from GPS can be used to determine which floor a user is located so long as the ground level elevation of the building is known. Vertical position such as floor level can also be supplied by the user, and supplemented by GPS elevation estimates. Indoor positioning technology to locate the vertical position of the user can also be used to identify the floor a companion and/or a user is located.

ETA Algorithm

A companion's trip to a user can include a plurality of segments requiring different modes of transportation. For example, in addition to travel by vehicle, a trip can require navigation through a multi-floor building or a venue such as a sports stadium. The mobile application server can calculate an estimated time of arrival ("ETA") by estimating the time it will take to traverse each segment. To that end, known algorithms can be used to calculate a travel time for segments of the trip taken in a vehicle or walked along known pedestrian paths and walkways. For other segments not requiring travel time in a building or other unmapped areas, a straight line distance between parties and an estimated walking speed of 20 minutes/mile can be used. The processing circuitry of the companion's mobile device can update an ETA value with every change in location (i.e., when a segment has been completely traversed). Once a route or segment is traversed, the travel time for that trip can be stored in Memory 206 and utilized to predict future trips by user's having similar mobility abilities.

The user's location can be determined periodically (e.g., every second or so) and changes can be reported to the mobility application server 350 less frequently (e.g., every 5 seconds) to reduce bandwidth. As a consequence of this configuration, and assuming that the companion is moving toward a stationary user, the companion's ETA will update more frequently than the user's ETA. Delay factors such as traffic lights and elevators (wait time) are difficult to estimate but can be improved with the collection of journey related information collected along each journey. Further, to better gauge real-world travel situations and augment any estimates travel, travel times may be determined and updated in real time including statistics for a specific venue.

Testing Scenarios

The following scenarios were tested to provide exemplary illustrations of the ability of a companion and a user to connect according to the present disclosure. These examples are also intended to identify some of the technical challenges addressed by this disclosure.

Scenario 1: Bathroom Pit Stop in Route to a Destination in a Multi-Floor Building A user with a mobility need arrives at a multi-level shopping center in order to meet a friend at a specific restaurant inside a food court within the shopping center. The user cannot move unless both hands are touching his rollator. The user is able to connect with a companion using his mobile device having processing circuitry programmed with functionality of the present disclosure to discover the exact location of the restaurant. Once the user reaches the lower level of the shopping center, he must ask the companion to help him find a bathroom.

Objectives:
1. Connect users in an environment with poor GPS connectivity.
2. Provide multi-floor navigation
3. React to improvisational needs of the User Scenario 2: Bus Trip A user with mobility needs has been invited to a last minute lunch meeting, but is unable to ride in his colleague's car because it is not wheelchair accessible. In response, the user elects to use public transportation and to request a companion for assistance during the bus ride. At the conclusion of the bus ride, the user requests a second companion for assistance reaching the restaurant where the lunch meeting is being held.

Objectives:
1. Pickup and handoff to distinct forms of transportation
2. Provide a practical solution for a long distance trip Scenario 3: Assisting a User on a Large College Campus A user is located at an unknown position on a college campus and requests assistance from a companion/guide. Prospective companions were tasked with locating the user using only the application.

Results:

The user traveled from a first building to a second building to a small shop on the campus. The user was able to see the companion's profile picture moving slowly towards the shop using the mobile unit's display. The companion used an electronic compass provided on her mobile unit's display to locate the user. Moreover, the user utilized the live video functionality to assist in the location process. While the companion was already heading in the right direction, the user showed the companion his surroundings for additional assistance and the companion was able to easily locate the user.

Observations:

The elevation indicator was a key component in helping the companion find the user, as the user decided to go into a separate building and a separate floor. The companion remarked: "I saw that it said level 1, so when I went in the elevator I just pressed 1 and assumed they would be somewhere on that level."

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A mobile device, comprising:
processing circuitry programmed to
request personal transportation assistance from a pool of candidate companions, the personal transportation assistance including assistance with a pedestrian mode of travel requiring assistance of a companion,
receive a location of a selected companion and a proposed route between a user of the mobile device and the selected companion, and
determine an estimated time of arrival of the selected companion at a current location of the user,
wherein the request for personal transportation assistance identifies at least one mobility need of the user unrelated to vehicular transportation.

2. A mobile device, comprising:
processing circuitry programmed to
determine whether a user of the mobile device is available to serve as a companion,
in a case where the user of the mobile device is determined to be available to serve as the companion, receive a request to provide personal transportation assistance for a user of a second mobile device, the personal transportation assistance including assistance with a pedestrian mode of travel requiring assistance of the companion,
notify the companion that the request has been received,
receive a response from the companion accepting or denying the request, and
in the case where the companion accepts the request, determine a proposed route and an estimated time of arrival of the companion at a current location of the user of the second mobile device, the proposed route including pedestrian travel, wherein the request to provide personal transportation assistance identifies at least one mobility need of the user unrelated to vehicular transportation.

3. A mobile application server comprising:

processing circuitry programmed to match a user having at least one mobility need with a companion having at least one characteristic suited to provide the user with personal transportation assistance, the personal transportation assistance including assistance with a pedestrian mode of travel requiring assistance of the companion, determine a route between a location of the companion and a location of the user, the route including at least one segment requiring non-vehicular routing for the companion, wherein the non-vehicular routing includes at least one of navigation within a building and routing where vehicular access is not permitted.

4. The mobile application server according to claim 3, wherein the at least one mobility need of the user relates to language, medical, autism spectrum, and other physical or mental challenges, and the processing circuitry is programmed to perform the matching based at least in part on the ability of the companion to accommodate the at least one mobility need.

* * * * *